(12) United States Patent
Miyata

(10) Patent No.: US 9,502,853 B2
(45) Date of Patent: Nov. 22, 2016

(54) GAS LASER DEVICE HAVING FUNCTION FOR DISCRIMINATING TYPE OF ALARM

(71) Applicant: FANUC CORPORATION, Minamitsuru-gun, Yamanashi (JP)

(72) Inventor: Ryusuke Miyata, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/872,334

(22) Filed: Oct. 1, 2015

(65) Prior Publication Data

US 2016/0099534 A1   Apr. 7, 2016

(30) Foreign Application Priority Data

Oct. 3, 2014  (JP) ................................. 2014-204748

(51) Int. Cl.
*H01S 3/104*  (2006.01)
*H01S 3/036*  (2006.01)

(52) U.S. Cl.
CPC ................ *H01S 3/104* (2013.01); *H01S 3/036* (2013.01)

(58) Field of Classification Search
CPC .......... H01S 3/104; H01S 3/036; H01S 3/03; H01S 3/032
See application file for complete search history.

(56) References Cited

U.S. PATENT DOCUMENTS

2001/0022797 A1* 9/2001 Hongu ................... H01S 3/036
372/55
2008/0304533 A1* 12/2008 Ando ................... H01S 3/0014
372/58

FOREIGN PATENT DOCUMENTS

| JP | 05190935 | 7/1993 |
| JP | 06061556 | 3/1994 |
| JP | 11087809 | 3/1999 |
| JP | 2008-306110 A | 12/2008 |
| JP | 2011-222586 A | 11/2011 |
| JP | 2014053423 | 3/2014 |

* cited by examiner

*Primary Examiner* — Dung Nguyen
(74) *Attorney, Agent, or Firm* — RatnerPrestia

(57) ABSTRACT

A gas laser device having a function for properly controlling the gas pressure of a laser oscillator after an alarm is generated. A controller of the laser device has an alarm monitoring part which monitors as to whether an alarm is generated in the oscillator, by which discharge in the oscillator should be stopped; an alarm judging part which discriminates a type of the alarm generated in the oscillator; a gas pressure controlling part which controls a pressure of laser gas within a discharge tube of the oscillator; and a power supply controlling part which controls a power supply of the oscillator. The gas pressure controlling part controls the pressure of the laser gas within the discharge tube to an appropriate value, after the alarm is generated, based on one of a plurality of control patterns predetermined corresponding to the respective types of the alarm.

1 Claim, 3 Drawing Sheets

GAS LASER DEVICE HAVING FUNCTION FOR DISCRIMINATING TYPE OF ALARM

BACKGROUND OF THE INVENTION

1. Field of the Invention

The present invention relates to a gas laser device having a function for discriminating a type of alarm generated in a laser oscillator.

2. Description of the Related Art

In the prior art, when an alarm is generated in a gas laser processing device having a laser oscillator in an operable state, a command for stopping discharge is transmitted to a laser power supply for safety purposes. In this regard, as a preparation for restoring the laser oscillator, the pressure of laser gas within a discharge tube of the oscillator is controlled so as to be decreased. This is because it is necessary to sufficiently reduce the gas pressure in order to initiate discharging when restarting the laser oscillator.

As a relevant prior art document, for example, JP 2008-306110 A discloses a start-up method for a discharge-excited gas laser unit, in which laser gas is circulated within a laser discharge tube, and a laser is generated by high-frequency discharge. This method includes the steps of: previously storing an output current characteristic, as a normal current characteristic, of a DC power supply part of a laser power supply unit of the gas laser unit when the gas laser unit is normally activated; detecting an output current of the DC power supply part of the laser power supply unit while the gas laser unit is activated; and controlling the pressure of the laser gas within the laser discharge tube such that the detected output current of the DC power supply part does not exceed a threshold which is determined based on the normal current characteristic (claim 1, etc.).

On the other hand, JP 2011-222586 A discloses a gas laser oscillator including: a power output command section for generating a power output command by superposing pulses at a head of each step, a voltage application section for applying a voltage to a discharge tube based on the power output command, a discharge tube voltage detection section for detecting a voltage of the discharge tube, a discharge tube monitoring section for monitoring the voltage of the discharge tube, and a discharge start judging section (CNC) for judging that discharging has started when difference between the change ratio of the voltage of the monitored discharge tube for the power output command and a change ratio of voltage of the discharge tube for the power output command that is predetermined based on data obtained during normal discharge in the discharge tube falls within a predetermined threshold value.

In the invention of JP 2008-306110 A or JP 2011-22586 A, the initiation of discharge in the laser oscillator can be judged even in the high gas pressure close to the pressure in the laser operation state, whereby the laser oscillator can be safely initiated in a relatively short time. However, in such a gas laser device, it is desired that a restoration time, from when the alarm is generated to when the laser oscillator is returned to the operable state, be reduced, and that an amount of consumption of laser gas, used to increase the laser gas pressure to the high pressure (or the pressure of the laser operation state) after the laser gas pressure is decreased for discharging, be reduced.

SUMMARY OF THE INVENTION

An object of the present invention is to provide a gas laser device having a function for properly controlling the gas pressure of a laser oscillator after an alarm is generated.

Accordingly, the invention provides a gas laser device having a discharge-excited gas laser oscillator, the gas laser device comprising: an alarm judging part which discriminates a type of alarm generated in the gas laser oscillator; and a gas pressure controlling part which controls a pressure of laser gas within a discharge tube of the gas laser oscillator, wherein the gas pressure controlling part controls the pressure of the laser gas within the discharge tube, after the alarm is generated, based on one of a plurality of control patterns which are predetermined corresponding to the types of the alarm.

In a preferred embodiment, when the alarm judging part judges that the type of the generated alarm indicates that the gas laser device can be in a processable state merely by initiating discharging, the gas pressure controlling part controls the pressure of the laser gas so as to maintain the pressure of the laser gas within the discharge tube from when the alarm is generated.

In a preferred embodiment, when the alarm judging part judges that the type of the generated alarm indicates that maintenance of a gas circulation system of the gas laser device is necessary, the gas pressure controlling part controls the pressure of the laser gas so as to increase the pressure of the laser gas within the discharge tube from when the alarm is generated.

In a preferred embodiment, when the alarm judging part judges that the type of the generated alarm indicates that it is necessary to initiate discharging of the gas laser device, the gas pressure controlling part controls the pressure of the laser gas so as to decrease the pressure of the laser gas within the discharge tube from when the alarm is generated.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
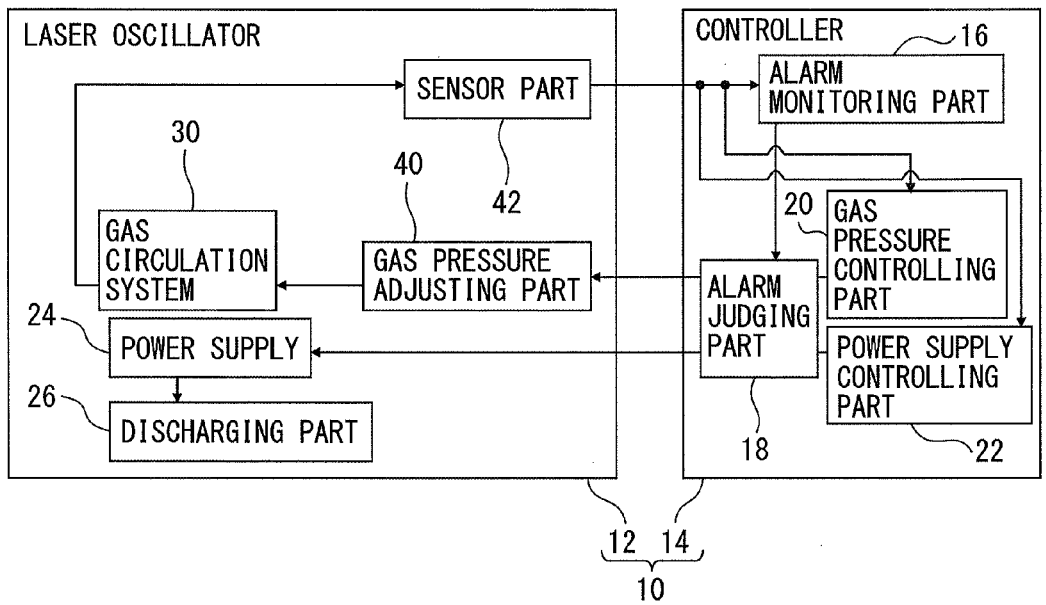
FIG. 1 shows a functional block diagram of a gas laser device according to a preferred embodiment of the present invention.

FIG. 1 shows a functional block diagram of a gas laser device according to a preferred embodiment of the present invention. Gas laser device 10 has a gas laser oscillator 12 and a controller 14 for controlling gas laser oscillator 12. Controller 14 has an alarm monitoring part 16 which monitors as to whether an alarm is generated in gas laser oscillator 12, by which discharge in oscillator 12 should be stopped; an alarm judging part 18 which discriminates a type of the alarm generated in gas laser oscillator 12; a gas pressure controlling part 20 which controls a pressure of laser gas within a discharge tube of gas laser oscillator 12; and a power supply controlling part 22 which controls a power supply of gas laser oscillator 12. Gas pressure controlling part 20 controls the pressure of the laser gas within the discharge tube to an appropriate value, after the alarm is generated, based on one of a plurality of control patterns which are predetermined corresponding to the respective types of the alarm, as explained below.

Figure 2:
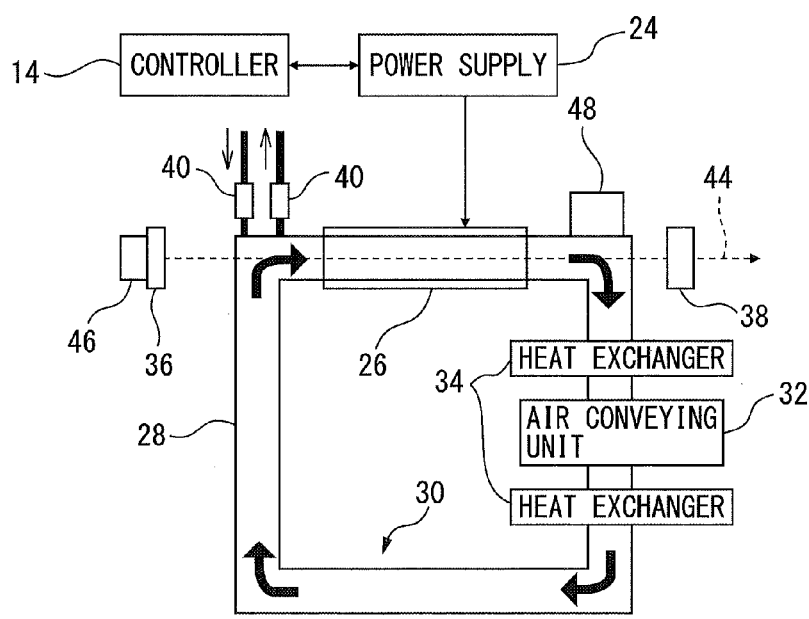
FIG. 2 shows a schematic configuration of a gas laser oscillator of the gas laser device of FIG. 1.

FIG. 2 shows a schematic configuration of gas laser oscillator 12. Gas laser oscillator 12 has a power supplying part 24 which outputs laser power such as high-frequency power, based on a power output command from power supply controlling part 22; a discharging part (or a discharge tube) 26 to which laser output (voltage) from power supplying part 24 is applied; and a gas flow channel 28 fluidically communicated with discharge tube 26 and filled with laser medium (or laser gas) such as carbon dioxide. Discharge tube 26 and flow channel 28 cooperatively constitute a gas circulation system 30.

The laser gas is circulated within the laser oscillator in a direction indicated by an arrow, by means of an air conveying unit 32 such as a turbo blower arranged on gas flow channel 28, and is cooled by heat exchangers 34 positioned on both sides of air conveying unit 32. Reference numerals 36 and 38 represent a total reflection mirror and a semitransparent mirror (or an output mirror), respectively, and these reflection mirrors and discharge tube constitute an optical resonator.

The gas pressure within gas flow channel 28 and discharge tube 26 (i.e., within gas circulation system 30) can be adjusted by a gas pressure adjusting part (an air suction/exhaust unit) 40, and air suction/exhaust unit 40 can be controlled by gas pressure controlling part of controller 14. The gas pressure within gas circulation system 30 can be detected by a sensor part 42, and the detected gas pressure is monitored by alarm monitoring part 16 of controller 14. When the gas pressure is out of a predetermined threshold range, alarm judging part 18 judges that the gas pressure is abnormal.

When the high-frequency power is supplied to discharge tube 26, the laser gas within discharge tube is excited by discharging, and a light is generated in the optical resonator. The light is amplified by induced emission while being reflected between total reflection mirror 36 and semitransparent mirror 38, and a part of the light is output outside semitransparent mirror 38 as a laser beam 44 so as to be used for laser processing, etc. In many cases, at a back side (opposed to the discharging part) of total reflection mirror 36, an absorber 46 for absorbing the laser beam is arranged, so as to avoid outside leakage of the laser beam.

Sensor part 42 as described above may be a pressure sensor 48 for detecting the gas pressure within gas circulation system 30, as shown in FIG. 2. Alternatively, sensor part 42 may include a sensor for detecting an abnormality by which the discharging should be stopped in laser oscillator 12, for example, a sensor for detecting the temperature of the laser gas within gas circulation system 30, a sensor for detecting an abnormality in the motion of a beam shutter (not shown), or a sensor for detecting an abnormality in beam reflection, etc.

Next, the detail of the gas pressure adjustment in gas circulation system 30 of laser oscillator 12 by controller 14 will be explained. In gas laser device 10, when the abnormality by which the discharging should be stopped is generated, an alarm or warning for informing the abnormality, such as a screen display, is output, whereby a process for stopping the discharging in laser oscillator 12 is carried out. As an example of the abnormality by which the discharging should be stopped, an abnormality in the motion of a beam shutter ("shutter motion abnormality"), an abnormality in reflection of the laser beam at the reflection mirror ("beam reflection abnormality"), a state in which assist gas used for laser welding is not prepared ("unprepared assist gas"), a state in which the temperature of the absorber positioned at the back side of the total reflection mirror is excessively increased ("absorber temperature abnormality"), a state in which laser oscillator 12 is brought to an emergency stop when the operator may be injured, etc. ("emergency stop state"), or a state in which a parameter relating discharging (applied voltage, gas pressure, gas flow rate, etc.) is changed ("discharge parameter change"), may be used.

After the above alarm requiring the stoppage of discharging is generated, in the prior art, the laser gas pressure is decreased, a cause of abnormality is removed, and then a restoration operation (initiating discharging and increasing the laser gas pressure) is carried out (see FIG. 3 as described below). Therefore, in the prior art, it takes time to restore laser oscillator 12 to its processable state and an amount of consumption of laser gas is relatively large.

Therefore, in the present invention, when the laser oscillator should be restored to its processable state after the alarm is generated, the type of the alarm is discriminated. Then, the laser gas pressure within the discharge tube is controlled based on one of the plurality of control patterns, which are predetermined corresponding to the respective types of alarm (for example, the control patterns are previously stored is a suitable memory of the controller, while being associated with the respective types of alarm). By virtue of this, the restoration time can be reduced (or an operation availability is improved), and the amount of consumption of the laser gas can be reduced. Concretely, the types of alarm may be classified into following three types, and alarm judging part 18 may determine as to which type the generated alarm corresponds to.

(1) In case it is necessary to assuredly initiate discharging, after the alarm is generated (2) In case the gas laser oscillator can be in a processable state again merely by initiating discharging, while maintain the state of the laser oscillator, after the alarm is generated (3) In case maintenance of the gas circulation system of the gas oscillator should be carried out, after the alarm is generated For example, the above types of alarm requiring the stoppage of discharging ("shutter motion abnormality," "beam reflection abnormality," "unprepared assist gas," "absorber temperature abnormality," "emergency stop state," or "discharge parameter change," etc.) correspond to type (2). This is because causes of these types of alarm can be removed without changing the gas pressure within gas circulation system 30.

For example, an alarm, indicating that discharging is not initiated when the gas laser device is activated ("discharging failure"), corresponds to type (1). In addition, with respect to the types of alarm corresponding to type (2), when discharging is not initiated even after the cause of the alarm is removed, such an alarm corresponds to type (1).

For example, an alarm indicating that the laser gas pressure is abnormal (for example, the laser gas pressure within gas circulation system 30 is significantly higher than a set value (lower than the atmosphere pressure)), corresponds to type (3). This is because, when such an alarm is generated, airtightness of gas circulation system 30 may be deteriorated (for example, a hole is generated in the circulation system) and thus it is necessary to carry out inspection or maintenance of gas circulation system 30.

Figure 3:
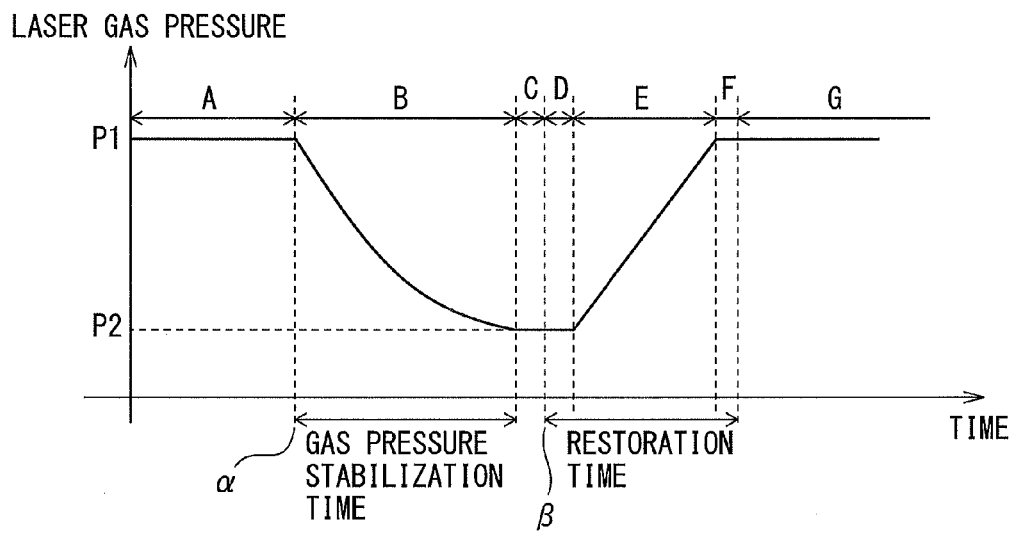
FIG. 3 shows a graph explaining a first pattern regarding discharge control and laser gas control after an alarm is generated.

FIG. 3 shows a graph explaining a first control pattern regarding discharging control and laser gas pressure control, when the generated alarm is judged as type (1) as described above. The first control pattern may be the same as the conventional control pattern. In other words, during a processable state (time period A) of gas laser oscillator 12, when the alarm requiring the stoppage of discharging is generated (at time point α), laser gas pressure P within gas circulation system 30 is controlled so as to decrease from pressure P1 in time period A to pressure P2 where discharging can be assuredly initiated, over a predetermined gas pressure stabilization time (time period B).

After the laser gas pressure is lowered to pressure P2, the cause of the alarm is removed during time period C, an then controller 14 transmits a restoration motion command to gas laser oscillator 12 (at time point β). In this regard, depending on a content of the cause of the generated alarm, the cause may be removed during time period B.

In gas laser oscillator 12, after receiving the restoration motion command from controller 14, discharging is initiated at discharge tube 26 during time period D, and then the laser gas pressure is increased (time period E). Next, a procedure for storing data, etc. is carried out in time period F, and laser oscillator 12 is returned to the processable state again (time period G). Therefore, in the case of FIG. 3, a summation of time periods D, E and F corresponds to the "restoration time."

Figure 4:
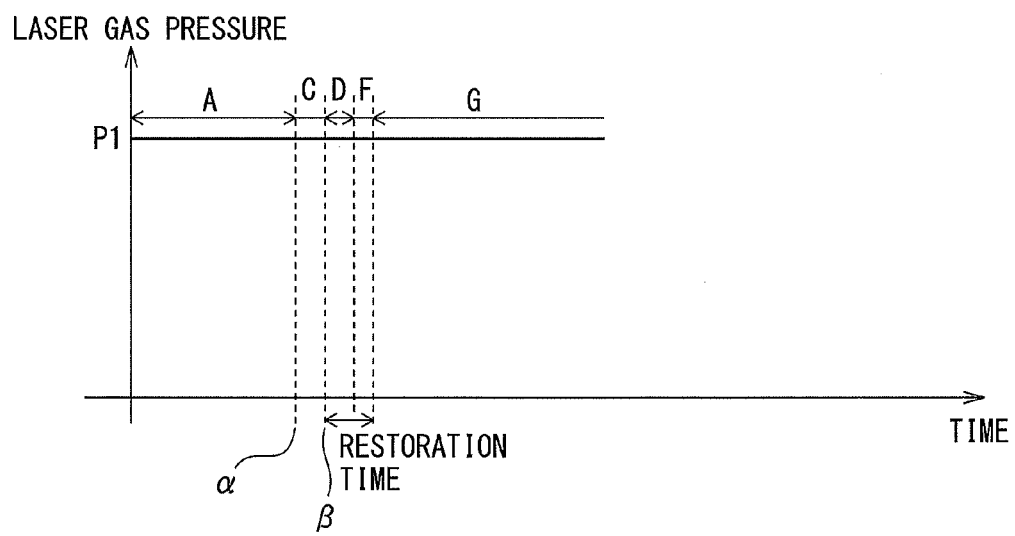
FIG. 4 shows a graph explaining a second pattern regarding discharge control and laser gas control after an alarm is generated.

FIG. 4 shows a graph explaining a second control pattern regarding discharging control and laser gas pressure control, when the generated alarm is judged as type (2) as described above. In the second control pattern, the laser gas pressure is not substantially changed. In other words, during the processable state (time period A) of gas laser oscillator 12, even when the alarm requiring the stoppage of discharging is generated (at time point α), the alarm of type (2) does not require control for changing the laser gas pressure. Therefore, the cause of the alarm is removed during time period C, while maintaining the laser gas pressure at pressure P1 at the time when the alarm is generated, and then the restoration motion command is transmitted (at time point β).

After receiving the restoration motion command from controller 14, discharging is initiated at discharge tube 26 during time period D, a procedure for storing data, etc. is carried out in time period F, and then laser oscillator 12 is returned to the processable state again (time period G). Therefore, in the case of FIG. 4, time periods B and E as shown in FIG. 3 are not necessary, and thus the period of time from when the alarm is generated to when the laser oscillator is returned to the processable state, and the amount of laser gas required in the period of time, can be significantly reduced in comparison to the case of FIG. 3.

Figure 5:
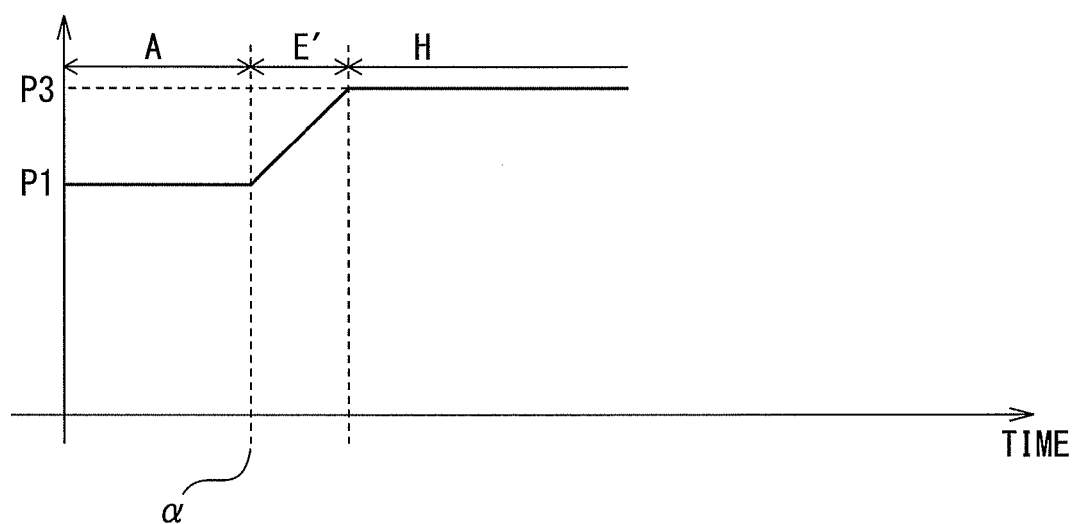
FIG. 5 shows a graph explaining a third pattern regarding discharge control and laser gas control after an alarm is generated.

FIG. 5 shows a graph explaining a third control pattern regarding discharging control and laser gas pressure control, when the generated alarm is judged as type (3) as described above. When the generated alarm corresponds to type (3), the laser gas pressure should be increased higher than the processable state (time period A), since gas circulation system 30 of laser oscillator should be opened to the atmosphere or the airtightness of gas circulation should be inspected, etc. In the third control pattern, the laser gas pressure is controlled so that the gas pressure is increased higher than pressure P1 at the time when the alarm is generated, without decreasing the laser gas pressure.

In the example of FIG. 5, the laser gas pressure is increased from pressure P1 to P3 during time period E', and then a predetermined maintenance operation for gas circulation system 30 is carried out during time period H, while maintaining the laser gas pressure at pressure P3. Therefore, in the case of FIG. 5, the period of time to when the gas pressure reaches a set value (P3) suitable for the maintenance operation of gas circulation system 30 can be significantly reduced, and the amount of consumption of the laser gas can also be reduced.

As described above, after the alarm is generated, by carrying out the discharging control and the laser gas pressure control based on one of the three control patterns corresponding to the type of the generated alarm, it is not necessary to decrease the laser gas pressure depending on the type of the alarm. Therefore, it is possible to carry out the restoration motion while maintaining the laser gas pressure at the laser operation state, and it is also possible to carry out the maintenance operation for the gas circulation system with a relatively small amount of consumption of the laser gas.

In addition, in controller 14, gas pressure controlling part 20 can automatically and properly control the gas pressure within gas circulation system 30 based on the type of the alarm judged by alarm judging part 18. However, the operator may manually input the type of the alarm to controller 14 when the alarm is generated.

According to the present invention, by carrying out the laser gas pressure control based on one of the three control patterns corresponding to the type of the generated alarm, it is not necessary to decrease the laser gas pressure depending on the type of the alarm. Therefore, it is possible to carry out the restoration motion while maintaining the laser gas pressure at the laser operation state, and it is also possible to carry out the maintenance operation for the gas circulation system with a small amount of consumption of the laser gas.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A gas laser device having a discharge-excited gas laser oscillator, configured to carry out a process for stopping discharging in the gas laser oscillator when an alarm by which the discharging should be stopped is generated, the gas laser device comprising:

an alarm judging part which discriminates a type of the alarm generated in the gas laser oscillator; and a gas pressure controlling part which controls a pressure of laser gas within a discharge tube of the gas laser oscillator, wherein the gas pressure controlling part controls the pressure of the laser gas within the discharge tube, after the alarm is generated, based on one of a plurality of control patterns which are predetermined corresponding to the types of the alarm, wherein, when the alarm judging part judges that the type of the generated alarm indicates that the gas laser device can be in a processable state merely by initiating discharging, the gas pressure controlling part controls the pressure of the laser gas so as to maintain the pressure of the laser gas within the discharge tube from when the alarm is generated, wherein, when the alarm judging part judges that the type of the generated alarm indicates that maintenance of a gas circulation system of the gas laser device is necessary, the gas pressure controlling part controls the pressure of the laser gas so as to increase the pressure of the laser gas within the discharge tube from when the alarm is generated, and wherein, when the alarm judging part judges that the type of the generated alarm indicates that it is necessary to assuredly initiate discharging of the gas laser device, the gas pressure controlling part controls the pressure of the laser gas so as to decrease the pressure of the laser gas within the discharge tube from when the alarm is generated.

* * * * *